United States Patent [19]
deGraffenried

[11] Patent Number: 6,113,036
[45] Date of Patent: *Sep. 5, 2000

[54] BOUNDARY LAYER CONTROL SYSTEM

[76] Inventor: Albert L. deGraffenried, 30 Washington Ave., Glen Head, N.Y. 11545

[*] Notice: This patent issued on a continued prosecution application filed under 37 CFR 1.53(d), and is subject to the twenty year patent term provisions of 35 U.S.C. 154(a)(2).

[21] Appl. No.: 09/018,689

[22] Filed: Feb. 4, 1998

Related U.S. Application Data

[60] Provisional application No. 60/038,295, Feb. 4, 1997.

[51] Int. Cl.$^7$ ....................................................... B64C 21/04
[52] U.S. Cl. ........................... 244/207; 244/130; 244/204; 244/203
[58] Field of Search ..................................... 244/207, 130, 244/204, 76 C, 45 A, 203, 232, 233

[56] References Cited

U.S. PATENT DOCUMENTS

| | | |
|---|---|---|
| 1,803,655 | 5/1931 | Salisbury et al. . |
| 3,064,927 | 11/1962 | Chaplin . |
| 3,917,193 | 11/1975 | Runnels . |
| 4,010,920 | 3/1977 | Farner .................................... 244/45 A |
| 4,752,049 | 6/1988 | Cole . |
| 4,932,611 | 6/1990 | Horikawa ............................... 244/76 C |

FOREIGN PATENT DOCUMENTS

| | | |
|---|---|---|
| 1071019 | 8/1954 | France ................................... 244/76 C |
| 746714 | 5/1943 | Germany ................................ 244/207 |
| 386352 | 1/1933 | United Kingdom ...................... 244/29 |
| 477395 | 12/1937 | United Kingdom ...................... 244/83 |
| 761077 | 11/1956 | United Kingdom .................... 244/130 |

*Primary Examiner*—Peter M. Poon
*Assistant Examiner*—Tien Dinh
*Attorney, Agent, or Firm*—Richard C. Conover

[57] ABSTRACT

A boundary layer control apparatus including a duct having a streamlined shape which is mounted in spaced apart relation upwind from the wing and extending generally parallel to the leading edge of the wing. The duct has a thickness substantially less than the thickness of the wing to which it is attached. The duct of the present invention includes an opening on the downwind side of the duct for injecting compressed air toward a stagnation line associated with the aircraft wing. The duct according to the present invention can be pivoted during flight so that the air injected from the duct is always directed at the stagnation line, which moves relative to the aircraft wing as aircraft speed increases.

6 Claims, 4 Drawing Sheets

6,113,036

BOUNDARY LAYER CONTROL SYSTEM

This application claims the benefit of U.S. Provisional No. 60/038,295 filed Feb. 4, 1997.

BACKGROUND OF THE INVENTION

This invention relates to apparatus for controlling the boundary layer of air moving adjacent to a wing as an aircraft moves through the air.

Apparatus for controlling the boundary layer on an aircraft wing are known. See, for example, U.S. Pat. No. 3,917,193, to Runnels, which describes an apparatus wherein a leading edge flap is used for directing a stream of air across a wing surface. This apparatus is used during low speed operation, when the leading edge flap is extended. Other patents showing leading edge flaps for controlling a boundary layer include U.S. Pat. No. 4,099,691 to Swanson, et al., and U.S. Pat. No. 4,285,482 to Lewis. An early patent, U.S. Pat. No. 1,887,148 to Ganahl, described an airplane propulsion apparatus which included apparatus for injecting a stream of air across the top of a wing surface.

The present invention overcomes a number of problems associated with conventional boundary layer control systems. Namely, the known systems only operate effectively at low aircraft speeds. No apparatus is known which effectively controls boundary layer growth at all aircraft speeds.

SUMMARY OF INVENTION

The present invention is directed to a boundary layer control apparatus wherein a duct having a streamlined shape is mounted in spaced apart relation upwind from the wing and extending generally parallel to the leading edge of the wing. The duct has a thickness substantially less than the thickness of the wing to which it is attached. The duct of the present invention includes an opening on the downwind side of the duct for injecting compressed air toward a stagnation line associated with the aircraft wing. The duct according to the present invention can be pivoted during flight so that the air injected from the duct is always directed at the stagnation line, which moves relative to the aircraft wing as aircraft speed increases. The duct according to the present invention can be pivoted either manually or with a servomechanism. The servomechanism utilizes two input control signals created by a pair of wind-flow sensors, one sensor mounted on top of the leading edge of the duct, and the other sensor mounted on the bottom of the leading edge of the duct. By pivoting the duct and measuring the wind-flow across these two sensors, the position of the stagnation line can be determined and the duct pivoted accordingly.

BRIEF DESCRIPTION OF THE DRAWINGS

In order that the invention may be clearly understood and readily carried into effect, a preferred embodiment of the invention will now be described, by way of example only, with reference to accompanying drawings wherein.

DESCRIPTION OF A PREFERRED EMBODIMENT

Figure 1:
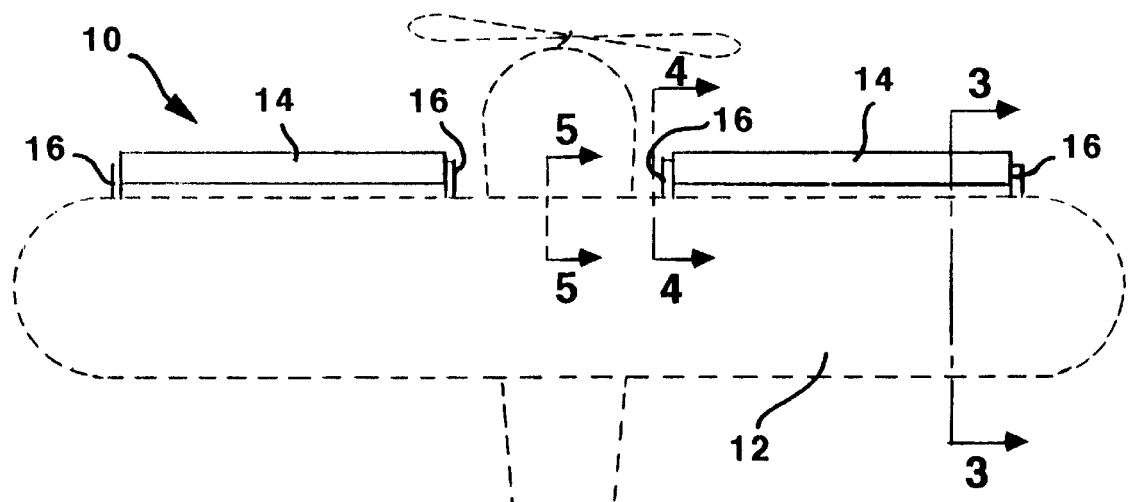
FIG. 1 is a top plan view of an aircraft with the boundary layer control system of the present invention installed.

A preferred embodiment of the boundary layer control system 10 is shown in FIG. 1 as installed on an aircraft wing.

Figure 2:
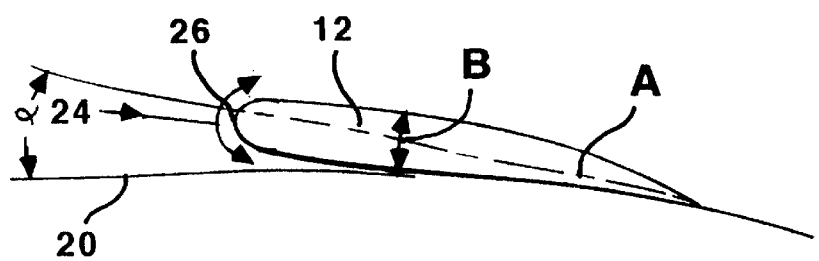
FIG. 2 is a schematic of a generalized wing cross-section having ambient air striking it.

To understand the present invention, reference is made to FIG. 2, which shows a schematic cross-section of a wing 12. The wing 12 has a straight line chord A connecting the two points spaced furthest apart as measured between the leading edge and the trailing edge of the wing. The thickness B of the wing is the maximum height of the wing measured perpendicular to the chord line. As wing 12 flies through ambient air, relative wind 20 strikes the wing. An angle-of-attack of is formed, which is the angle between the changeable relative wind vector 20 and the fixed chord line A of the wing. During flight, at high air speeds will be low; at low air speeds will be high. A specific streamline 24 in relative wind 20, strikes wing 12 at a leading edge stagnation line 26 extending along the wing (shown as point 26 in FIG. 2). The stagnation line 26 occurs where streamline 24 divides so that a portion of the streamline goes over the top of the wing and a portion goes beneath the wing.

The velocity of relative wind 20 also drops to nearly zero in a very small volume extending along the leading edge stagnation line 26. The change in momentum of ambient air molecules changing from aircraft velocity to nearly zero is felt as drag coming from the wing. As the angle-of-attack changes during flight, the leading edge stagnation line 26 changes position along the leading edge of wing 12 so as to move closer or away from the top of the wing.

The present invention is directed to apparatus for injecting high speed air at the stagnation line 26 to reduce drag by enabling ambient air to flow around the stagnation line without reducing its velocity to zero. Further the present invention is directed to a leading edge duct for injecting air toward the stagnation line which duct has a thickness substantially less than the wing to which it is attached.

Figure 3:
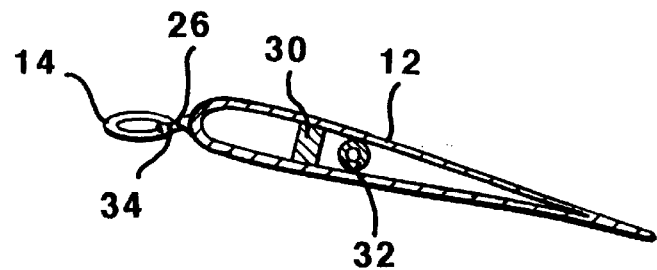
FIG. 3 is a cross-section taken along the line 3—3 in FIG. 1 with background parts broken away.

As best seen in FIG. 3, boundary layer control apparatus 10 includes a streamlined duct 14, mounted to a wing 12 in spaced apart relation upwind from the leading edge of the wing and extends generally parallel to the leading edge of the wing.

Duct 14 is preferably streamlined in shape and has a thickness substantially less than the thickness of the wing to which it is attached. A source of compressed air (not shown) is connected in fluid communication with air supply 32, which in turn is connected in fluid communication with duct 14. Duct 14 further includes an injector opening 34, which in a preferred embodiment is a slit. Other types of openings, such as nozzles, may be used with beneficial effect. The injector opening 34 is located on the downwind side of duct 14 and is positioned to inject compressed air from duct 14 to the leading edge of stagnation line 26. The pressure of the compressed air directed to duct 14 is adjusted with means (not shown) so that the air exiting injector opening 34 has a velocity greater than the relative wind. In a preferred embodiment, this exit velocity is adjusted to be 20–30% greater than the relative wind velocity. When opening 34 is a slit, compressed air exits slit 34 as a high velocity sheet of compressed air aimed at the stagnation line 26.

Figure 4:
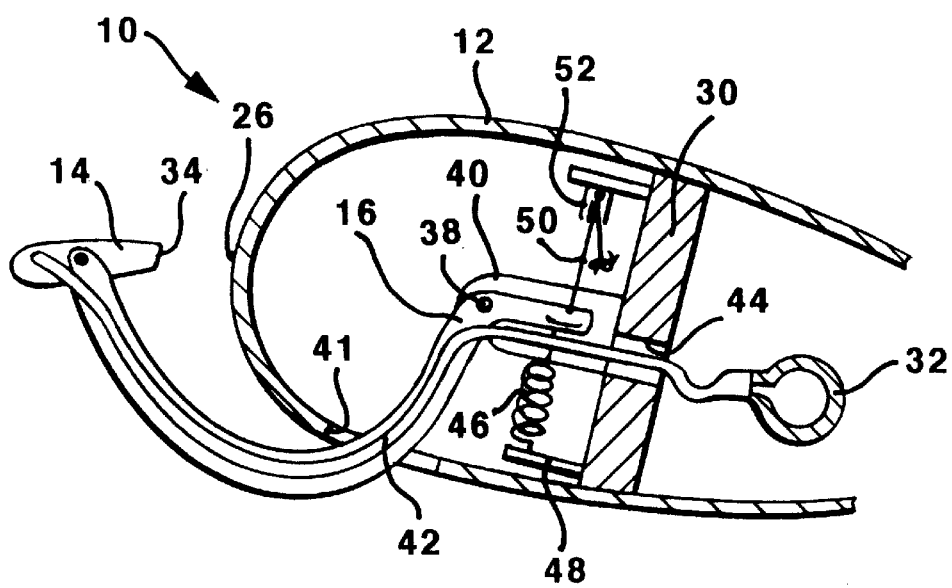
FIG. 4 is an enlarged cross-section taken along the line 4—4 in FIG. 1 with background parts broken away, showing a manual system for pivoting a boundary control duct according to the present invention.

As best seen in FIG. 4, duct 14 is held in position by support arm 16. There is a similar support arm 16 located at the opposite end of duct 14. Support arms 16 are fixedly attached to each end of conduit 14, and are pivotally attached to wing 12 with axles 38. Axles 38 are held in position by a fixed flange 40. Opening 41 in wing 12, through which a support arm 16 extends, is sized to permit support arm 16 to pivot duct 14 between an aircraft's smallest angle-of-attack 22 and its largest angle-of-attack. Optionally, a sliding cover, a rubber boot, or any other device well known in the art, can be used to cover opening 41 while allowing support arm 16 to pivot between the two extremes of the angle-of-attack.

Compressed air supply tube 32, extending in the interior of wing 12, has a flexible hose 42, which is connected to compressed air support tube 32 to provide fluid communication between the supply tube 32 and duct 14. Hose 42 is flexible to allow movement of support arm 16.

It is desired to move duct 14 as the angle-of-attack changes during flight, so that air injected through opening 34 is oriented to insert air at the stagnation line. Any suitable mechanical, hydraulic, or electromechanical apparatus may be used, as is well known to those skilled in the art, to pivot duct 14.

Figure 5:
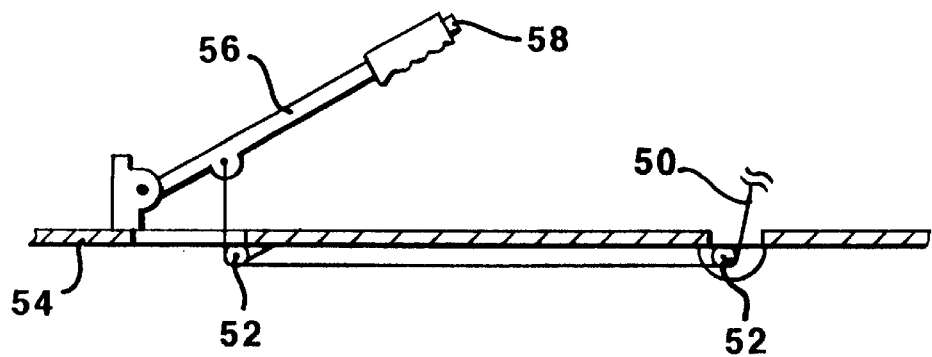
FIG. 5 is an enlarged cross-section of a cockpit floor taken along the line 5—5 in FIG. 1 and with background parts broken away, showing a manual system for pivoting a boundary control duct according to the present invention.

One such manual system is shown in FIGS. 4 and 5. A spring 46 is attached between support arm 16 and a fixed spring flange 48 attached to a spar 30 of wing 12. The support arm 16 acts as a bell crank. A spring return 46 is attached to support arm 16 on the side of axle 38 opposite duct 14 and acts to bias duct 14 to a position where air is inserted at the stagnation line corresponding to a minimum angle-of-attack. A cable 50 is attached to support arm 16 as shown in FIG. 4. Cable 50 is led through any appropriate number of pulleys 52 or guides (not shown) so as to emerge through the cockpit floor as shown in FIG. 5. The free end of cable 50 is then attached to a conventional lock and release handle 56. By pulling lock and release handle up and locking it, duct 14 is pivoted to a greater angle-of-attack 22 (lowered relative to the top of wing 12) and held there. When it is desired to raise duct 14 relative to wing 12, button 58 is pushed on lock and release handle 56 so that spring 46 pivots support arm 16 and conduit 14 back to a position closer to the top of the wing.

Figure 6:
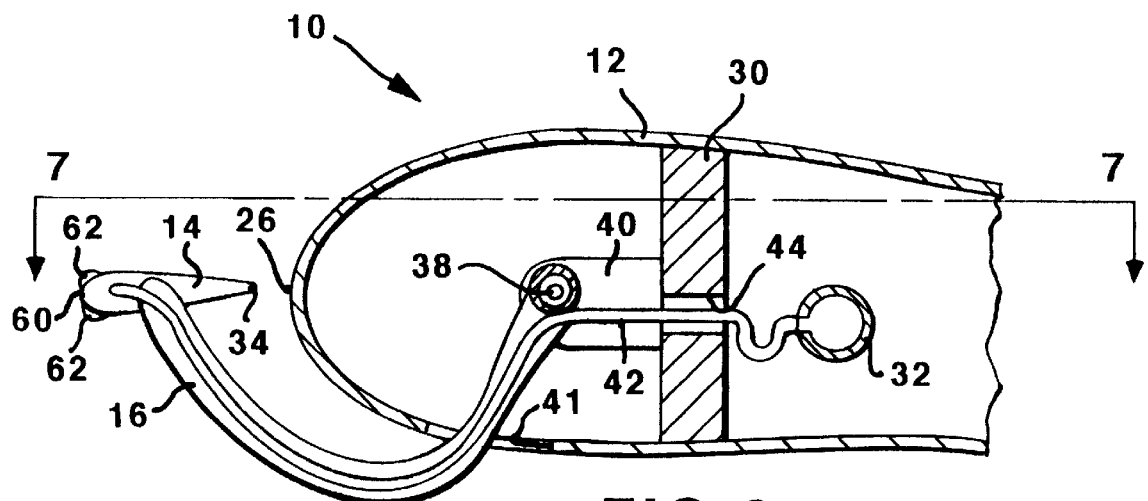
FIG. 6 is an enlarged elevational cross-section of a second embodiment of a boundary layer control system taken along the line 4—4 in FIG. 1 with background parts broken away, showing a servomechanism apparatus for pivoting the boundary control duct according to the present invention.
Figure 7:
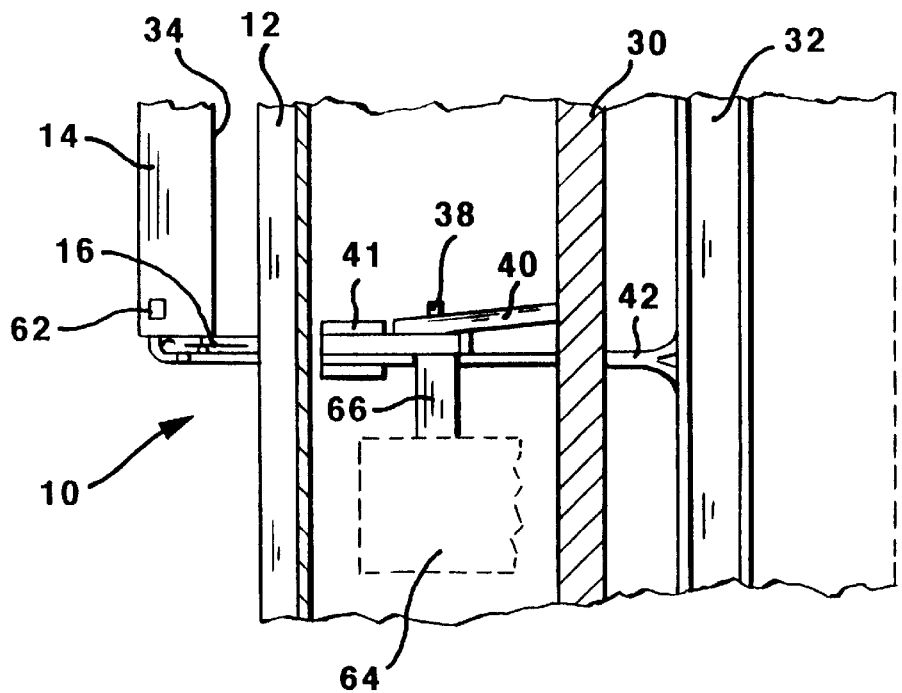
FIG. 7 is a top plan cross-sectional view of the second embodiment taken along the line 7—7 in FIG. 6.
Figure 8:
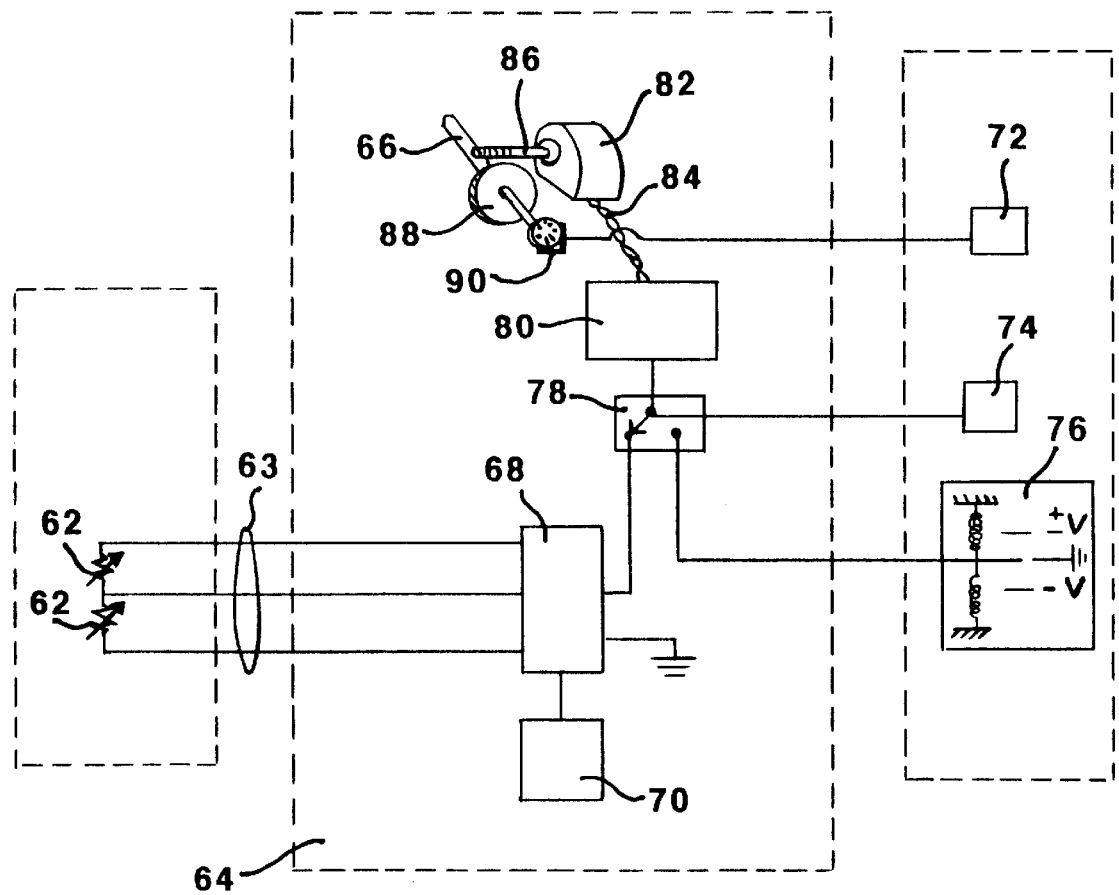
FIG. 8 is an electromechanical view of the components in a black box shown in FIG. 7.

A second embodiment of a system for pivoting duct 14 is shown in FIGS. 6–8. In this embodiment, a servomechanism is used to control the positioning of duct 14. The mechanical structure shown in FIG. 6 is similar to that shown in FIG. 4, but without the spring and cable to move duct 14. As duct 14 encounters relative wind, a dividing line 60 develops along the leading edge of duct 14 that is similar to leading edge stagnation line 26.

Two wind-flow sensors 62 are provided with one positioned on either side of dividing line 60 as best seen in FIG. 6. In a preferred embodiment, the wind-flow sensors 62 are conventional resistance-temperature sensors. Resistance-temperature sensors have the property that as the temperature of the sensor changes the resistance also changes by a corresponding amount. The sensor 62 that has the most airflow over it becomes cooler than the other sensor of the pair, and this is reflected in the electrical resistance of the sensor. Each sensor 62 provides an electrical output signal dependent on the resistance of the sensor. A three-wire cable 63 connects the pair of output signals of wind-flow sensors 62 with an electromechanical circuit 64. This circuit 64 is schematically shown in FIG. 8.

The electro-mechanical circuit 64 is used to pivot duct 14 automatically until the wind-flow across one sensor 62 is equal to the wind-flow across the other sensor 62. When the signals of the two sensors 62 are equal, the injector opening 34 is properly oriented so that air existing opening 34 is aimed at the stagnation line 26.

With reference to FIG. 8, schematically showing the elements of electro-mechanical circuit 64, the cable 63 is led to a direct current amplifier 68. Amplifier 68 is powered by power supply 70. The output of amplifier 68 is led through mode selector switch 78, and from there to pulse generator and amplifier 80. If the pilot selects a manual mode by using selector switch actuator 74, located in the cockpit, selector switch 78 is switched to receive manual inputs rather than the outputs of amplifier 68. Manual switch 76, also located in the cockpit, which has either plus or minus direct current voltages available at the terminals, can be toggled by the pilot to provide plus or minus input voltages to pulse generator and amplifier 80.

Whenever pulse generator and amplifier 80 have a voltage input, it sends an appropriate pulse to stepping motor and speed reducer 82 to actuate the motor in the appropriate direction. Stepping motor and speed reducer 82 then turns worm gear shaft 86 which in turn turns worm wheel 88. Worm wheel 88 is attached to axle 66; and axle 66 is fixedly attached to support arm 16. As worm wheel 88 turns, so does support arm 16.

A digital pick-up device 90 is attached to axle 66 to sense the shaft position of axle 66 and provide an electrical signal to readout indicator 72 in the cockpit to provide instantaneous information to the pilot as to the angular location of duct 14.

In operation, boundary layer control system 10 is used to direct high-velocity compressed air at the leading edge stagnation line 26 that extends along wing 12. As flight attitudes change during flight, compressed air exiting slit 34 may be redirected at the relocated leading edge stagnation line 26. Support arms 16 are pivoted using any of the means well known in the art to pivot and hold conduit 14 in a changed position. This position is then held until another change in position of leading edge stagnation line 26 occurs.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A boundary layer control apparatus for an aircraft wing having a leading edge stagnation line and having an angle of attack when traveling in relative wind, the boundary layer control apparatus comprising:

a movable duct mounted to the wing in spaced apart relation upwind from the wing and extending generally parallel to the leading edge of the wing;

the duct having a stream-lined shape and having a thickness substantially less than the thickness of the wing to which it is mounted;

a source of compressed air;

means for directing the compressed air to the duct; and an injector opening comprising a slit extending substantially the length of the duct, which opening is formed in the duct on the downwind side of the duct through which the compressed air is directed toward the wing;

the compressed air having sufficient pressure such that the air exiting the injector opening expands to provide an airstream having a velocity greater than the relative wind across the wing; and control apparatus for moving the duct along a curvilinear path to a position where the air exiting the injector opening is directed toward the stagnation line of the wing at all angles of attack.

2. The boundary layer control apparatus of claim 1 wherein the control apparatus for moving the duct includes a bell crank for moving the duct with respect to the wing, with the duct connected to a first operative side of the bell crank and a pulling cable connected to a second operative side of the bell crank.

3. The boundary layer control apparatus of claim 2 further including a spring return connected to the second operative side of the bell crank for biasing the duct to a predetermined position.

4. The boundary layer control apparatus of claim 1 wherein the control apparatus for moving the duct includes a servomechanism for moving the duct with respect to the wing.

5. The boundary layer control apparatus of claim 4 further including a pair of wind-flow sensors, one sensor mounted on top of the leading edge of the duct and the second sensor mounted on the bottom of the leading edge of the duct, each sensor providing a signal output corresponding to the wind-flow across the sensor, and wherein the two signal outputs of the sensors provide two input control signals to the servomechanism.

6. The boundary layer control apparatus of claim 5 wherein the servomechanism includes a feedback loop to move the duct so as to equalize the signal outputs of the two wind-flow sensors.

* * * * *